(12) United States Patent
Heydt et al.

(10) Patent No.: US 6,768,609 B2
(45) Date of Patent: Jul. 27, 2004

(54) REDUCING POSITION ERROR SIGNAL NONLINEARITY THROUGH ITERATIVE CALIBRATION OF A COMPENSATION TABLE

(75) Inventors: Jeffrey A. Heydt, Oklahoma City, OK (US); James B. Ray, Bethany, OK (US)

(73) Assignee: Seagate Technology LLC, Scotts Valley, CA (US)

(*) Notice: Subject to any disclaimer, the term of this patent is extended or adjusted under 35 U.S.C. 154(b) by 317 days.

(21) Appl. No.: 09/895,658

(22) Filed: Jun. 28, 2001

(65) Prior Publication Data

US 2002/0089779 A1 Jul. 11, 2002

Related U.S. Application Data

(60) Provisional application No. 60/253,181, filed on Nov. 27, 2000.

(51) Int. Cl.[7] .............................................. G11B 5/596
(52) U.S. Cl. .................................. 360/77.08; 360/77.02
(58) Field of Search ............................ 360/77.08, 77.02

(56) References Cited

U.S. PATENT DOCUMENTS

| | | | |
|---|---|---|---|
| 4,628,379 A | 12/1986 | Andrews, Jr. et al. | |
| 4,691,152 A | 9/1987 | Ell et al. | |
| 5,109,307 A | 4/1992 | Sidman | |
| 5,168,398 A | 12/1992 | Kanda et al. | |
| 5,539,714 A | 7/1996 | Andrews, Jr. et al. | |
| 5,566,034 A | 10/1996 | Shumaker | |
| 5,600,506 A | 2/1997 | Baum et al. | |
| 5,717,538 A | 2/1998 | Cheung et al. | |
| 5,774,297 A | 6/1998 | Hampshire et al. | |
| 5,793,559 A | 8/1998 | Shepherd et al. | |
| 5,867,341 A | 2/1999 | Volz et al. | |
| 5,926,338 A | 7/1999 | Jeon et al. | |
| 5,978,169 A | * 11/1999 | Woods | 360/77.04 |
| 6,046,879 A | 4/2000 | Hampshire | |
| 6,072,654 A | 6/2000 | Eddy | |
| 6,078,460 A | 6/2000 | Moriya | |
| 6,091,567 A | 7/2000 | Cooper et al. | |
| 6,347,018 B1 | * 2/2002 | Kadlec et al. | 360/77.08 |

* cited by examiner

Primary Examiner—David Hudspeth
Assistant Examiner—Mitchell Slavitt
(74) Attorney, Agent, or Firm—Fellers, Snider, et al.

(57) ABSTRACT

Apparatus and method for reducing nonlinearities in a position error signal (PES) of a disc drive data handling system. The disc drive data handling system includes a disc recording surface having a number of tracks and a controllably positionable read/write head. A servo circuit generates a sequence of PES samples indicative of head position with respect to a selected track using servo position data samples transduced from the selected track and a first set of compensation values selected to reduce nonlinearities in said PES samples. The PES samples are combined with the first set of compensation values to generate an updated set of compensation values. This process is preferably repeated a number of iterations to converge to a final set of compensation values which provide a substantially linear PES across the radial width of each track.

15 Claims, 9 Drawing Sheets

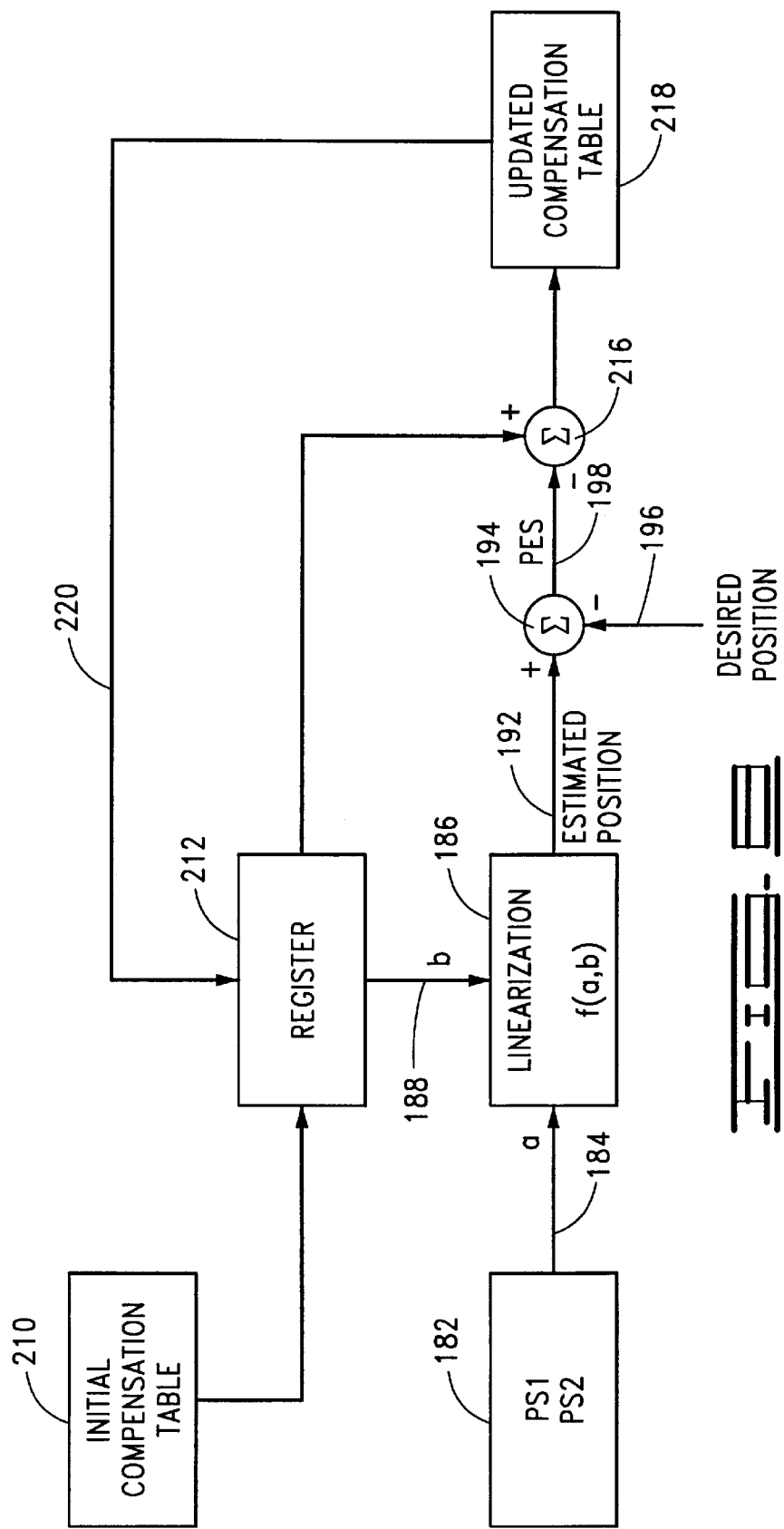

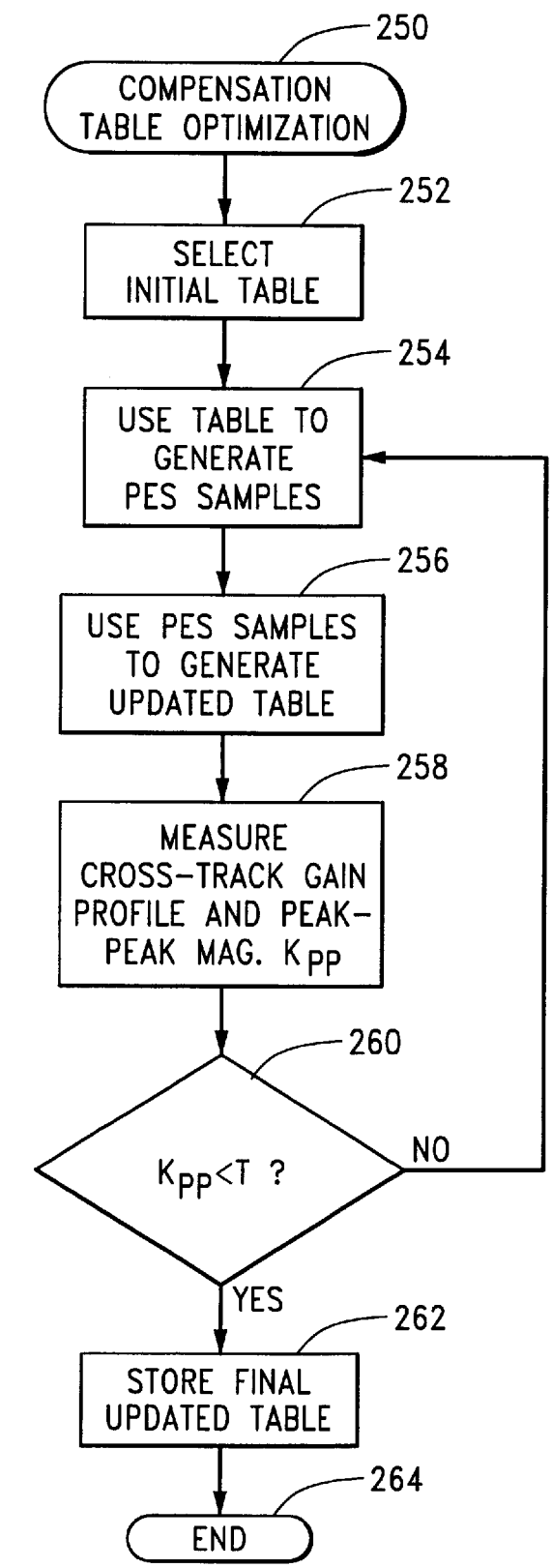
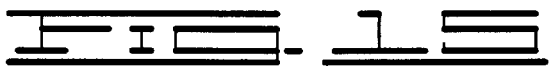

REDUCING POSITION ERROR SIGNAL NONLINEARITY THROUGH ITERATIVE CALIBRATION OF A COMPENSATION TABLE

RELATED APPLICATIONS

This application claims priority to U.S. Provisional Application No. 60/253,181 filed Nov. 27, 2000.

FIELD OF THE INVENTION

The claimed invention relates generally to the field of disc drive data handling systems, and more particularly, but not by way of limitation, to a method and apparatus for improving servo control response in a disc drive servo system through the iterative calibration of compensation values stored in a compensation table and used to reduce nonlinearities in a position error signal.

BACKGROUND

Disc drives are data handling systems used to magnetically store and retrieve digital data files. A typical disc drive comprises one or more rigid recording storage discs arranged about a spindle motor for rotation at a constant high speed. A corresponding array of read/write heads are provided to transfer data between tracks defined on the disc surfaces and a host device (such as a computer) in which the disc drive is mounted. The heads are mounted to a rotary actuator and are controllably positioned adjacent the tracks through the application of current to an actuator motor (such as a voice coil motor, VCM).

Present generation disc drives typically employ heads which utilize separate read and write elements. The write element typically has a thin-film inductive coil construction with a write gap placed in close proximity to the recording medium. Input data to be written to a disc are encoded and serialized to generate a series of bi-directional write currents which are applied to the write element. Each change in the polarity of the write current results in a magnetic flux reversal, or flux transition, in the recording medium. Data are thus recorded along each track at a selected frequency in relation to the presence of a flux transition (a logical 1) or the absence of a flux transition (a logical 0) at regular intervals along the track.

The read element is typically provided from a magneto-resistive (MR) material which is configured to exhibit changed electrical characteristics when subjected to a magnetic field of a selected orientation. During a read operation, the read element is biased using a relatively small bias current (or bias voltage), and the selective magnetization of the disc is detected in relation to induced changes in voltage across (or current through) the read element caused by the magnetization pattern along the track.

A closed loop, digital servo control system (servo circuit) is used to control the position of the heads. Servo data written to the discs during disc drive manufacturing are transduced by a selected head and provided to the servo circuit to sense head position. The servo circuit generates a position error signal (PES) indicative of head position error and applies current control signals to the actuator motor to adjust the position of the selected head to a desired relation to the selected track (such as over the center of the track). A typical PES is expressed as a sequence of digital PES samples which ideally increase at a linear rate across the width of the track as the selected head is swept from one track boundary to the next.

However, various factors have been found to introduce nonlinearities in a PES so that the PES increases in a nonlinear fashion as the head is swept across the width of a track at a selected rate. Such nonlinearities, if sufficiently pronounced, can adversely affect the stability of the servo loop. Efforts have therefore been employed in the prior art to linearize a PES.

One approach exemplified by U.S. Pat. No. 6,091,567 issued to Hampshire initially determines different forms of PES from the same transduced servo position data, with each of the different, initial PES forms having different nonlinear characteristics across the radial width of a selected track. A final, composite PES is formed as a weighted combination of the various initial PES forms, with the final, composite PES having substantially linear characteristics across the radial width of the track.

Another approach exemplified by U.S. Pat. No. 5,774,297 issued to Hampshire et al. also determines different forms of PES having different nonlinear characteristics form the same transduced servo data. However, this reference precisely maintains the position of the head in one location over the track (such as over track center) using one of the PES forms that exhibits nominally linear characteristics in this location while adding compensation terms to a second one of the PES forms until the second PES form exhibits linear characteristics in said location. The compensation terms are thereafter used in conjunction with the second PES form to position the head during normal operation.

U.S. Pat. No. 6,046,879 issued to Cooper et al. takes a different approach: instead of attempting to adjust a raw PES to remove nonlinearities therein, this reference provides a nonlinear controller which models, and thereby compensates, the nonlinearities present in the raw PES.

It should be noted at this point that the PES nonlinearity problems discussed above are substantially different from, and are not to be confused with, the presence of repeated runout (RRO) error in a PES over a complete revolution of the disc. This latter phenomenon occurs due to factors such as disc eccentricity (i.e., a slight disc shift after the servo data are read) and slight radial errors in the location of the various servo data fields that deviate from a true circle about the rotational axis.

The presence of RRO in a PES can be detected by holding a selected head in a fixed radial relationship to a track on the corresponding disc. If the track is perfectly circular, there will be no variation in detected intra-track position from each of the servo data fields encountered as the disc makes a complete revolution. On the other hand, the presence of RRO will be exhibited as a frequency signal superimposed onto the PES that repeats over each disc revolution. Even though the head is maintained perfectly still over the disc, the RRO will cause the head to appear to wobble or oscillate about the selected track.

Thus, efforts to reduce RRO advantageously correct track eccentricities, but do not otherwise remove nonlinearities in the PES as the head is advanced across the radial width of a selected track. For reference, efforts to compensate for such RRO are exemplified by U.S. Pat. No. 5,539,714 issued to Andrews, Jr. and U.S. Pat. No. 5,978,169 issued to Woods, each of which generally disclose generating and injecting a feed-forward correction signal into the servo loop in relation to the error in the radial placement of each set of servo position data about the track.

A continued trend in the industry is to provide disc drives with ever greater levels of data storage and data rate capabilities, including ever greater track densities. Thus, there remains a continued need for improvements in the art to compensate for PES nonlinearities.

SUMMARY OF THE INVENTION

In accordance with preferred embodiments, a servo circuit of a disc drive data handling system operates to generate a sequence of position error signal (PES) samples indicative of head position with respect to a selected track on a disc surface using servo position data samples transduced from the selected track. The servo circuit further operates to generate the sequence of PES samples in relation to an initial, first set of compensation values selected to reduce nonlinearities in said PES samples across the radial width of said track. Preferably, the initial set of compensation values are globally applied during manufacturing to a population of nominal disc drives and serve to provide a first cut at PES linearization.

Nonlinearities remaining in the PES samples obtained using the initial compensation values will tend to indicate the extent to which the initial compensation values were deficient in removing all such nonlinearities from the PES samples. Thus, the PES samples obtained during the foregoing operation are combined with the first set of compensation values to generate an updated, second set of compensation values which will tend to exhibit improved linearization performance. In some preferred embodiments, the calibration process ends at this point and the second set of compensation values are thereafter used during normal drive operation to generate PES samples for various tracks on the disc recording surface.

In other related embodiments, the foregoing calibration operation is repeated a number of iterations to converge to a final set of compensation values. The most recently derived set of compensation values is used during each iteration pass. Gain measurements are preferably taken at the conclusion of each iteration pass to obtain a gain profile as a measure of PES nonlinearity across the radial width of the track. The maximum peak to peak magnitude of the gain profile is compared to a preselected threshold, and the most recently derived set of compensation values that provides a magnitude within the threshold is selected as the final set of compensation values.

These and various other features and advantages which characterize the claimed invention will be apparent from a reading of the following detailed description and a review of the associated drawings.

BRIEF DESCRIPTION OF THE DRAWINGS

FIG. 7 is a graphical representation of a nominally linearized PES obtained by the operation of the circuit of FIG. 6.

FIG. 8 is a control diagram of a portion of the servo circuit of FIG. 2 used to iteratively determine the final PES compensation values of the compensation table.

FIG. 9 is a basic control diagram for the servo circuit of FIG. 2 showing the general manner in which gain values are obtained for a particular set of PES compensation values.

FIG. 15 is a flow chart for a COMPENSATION TABLE OPTIMIZATION routine, generally illustrative of steps carried out in accordance with preferred embodiments of the present invention to arrive at the final PES compensation values.

DETAILED DESCRIPTION

Figure 1:
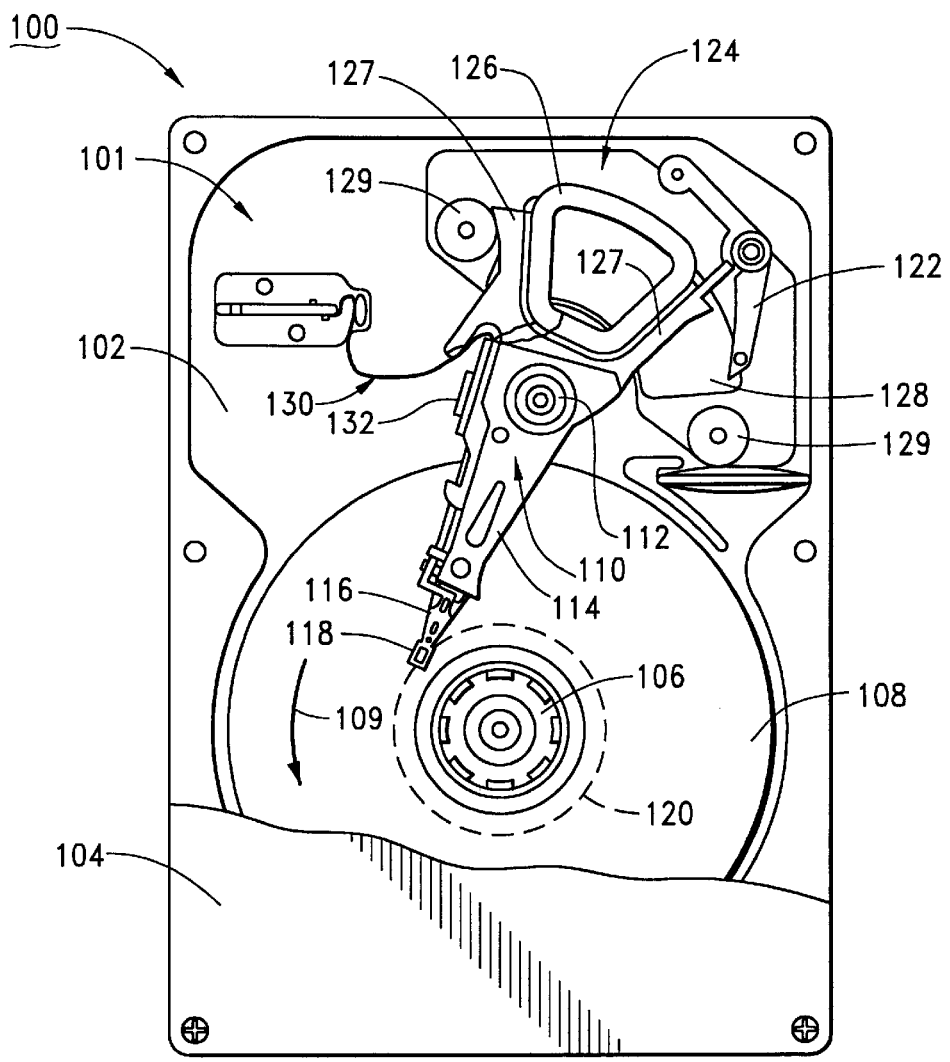
FIG. 1 is a top plan view of a disc drive data handling system (disc drive) constructed in accordance with preferred embodiments of the present invention.

Referring to the drawings in general, and more particularly to FIG. 1, shown therein is a top plan view of a disc drive data handling system 100 (hereinafter "disc drive") constructed in accordance with preferred embodiments of the present invention. It will be understood that the disc drive 100 is provided for purposes of illustration and numerous variations in construction and operation can readily be employed.

The disc drive 100 includes a head-disc assembly (HDA) 101 which houses various mechanical components of the disc drive 100, and a disc drive printed circuit board assembly (PCBA) which supports various electronic communication and control circuits of the drive. The PCBA is affixed to the underside of the HDA 101 and is therefore not visible in FIG. 1.

The HDA 101 includes a base deck 102 which, in cooperation with a top cover 104 (shown in partial cut-away), forms an internal housing for the disc drive 100. A spindle motor 106 is supported within the housing to rotate a number of recording discs 108 in an angular direction indicated at 109.

An actuator 110 is provided adjacent the discs 108 and rotates about a cartridge bearing assembly 112 mounted to the base deck 102. The actuator 110 includes a number of rigid actuator arms 114 from which flexible suspensions (flexures) 116 extend. The distal end of each flexure 116 supports a read/write transducing head 118.

The heads 118 are contemplated as having a magnetoresistive (MR) construction so that each head has a thin-film inductive write element and an MR read element. The heads 118 incorporate aerodynamic features which allow the heads to be supported over the corresponding disc surfaces while the discs 108 are rotated. When the disc drive is deactivated, the heads 118 are brought to rest upon texturized landing zones 120 near the innermost diameters of the discs 108. A magnetic latch 122 secures the actuator 110 in this position.

A voice coil motor (VCM) 124 is used to rotate the actuator 110 about the cartridge bearing assembly 112. The VCM 124 includes an actuator coil 126 supported by coil support arms 127 which project from the actuator 110. The coil is immersed in a magnetic field produced by a pair of permanent magnets (the bottom of which is shown at 128). The heads 118 are moved across the disc surfaces through the controlled application of current to the coil 126. End stops 129 limit the radial extent of travel of the actuator 110.

A flex circuit assembly 130 provides electrical communication paths between the actuator 110 and the disc drive PCBA. The flex circuit assembly 130 includes a preamplifier driver circuit 132 mounted to the side of the actuator 110. As discussed in greater detail below, the preamplifier driver circuit 132 (preamp) provides write and read bias currents to the heads and preamplifies readback signals from the heads during data transfer operations.

Figure 2:
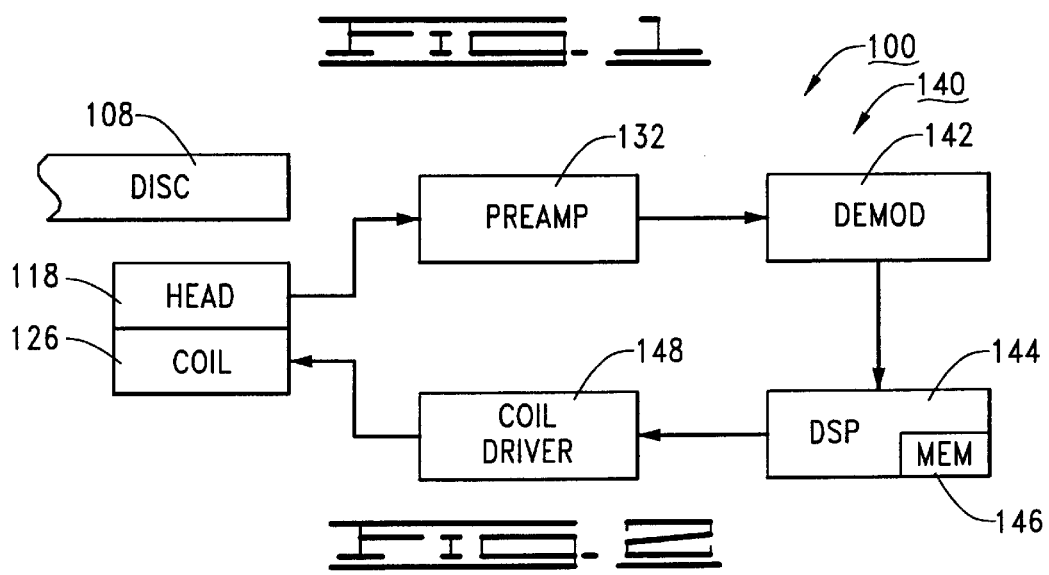
FIG. 2 provides a functional block diagram of a closed loop, digital servo control system (servo circuit) of the disc drive of FIG. 1.

FIG. 2 provides a functional block diagram of a closed loop, digital servo control system 140 (herein referred to as a "servo circuit") used to control the position of the heads 118. Servo data written to the discs during disc drive manufacturing are transduced by a selected head 118, preamplified by the preamp 132 and supplied to a demodulation circuit (demod) 142. The demod 142 conditions the servo data and provides digital samples to a digital signal processor (DSP) 144. The DSP 144 operates in response to programming in DSP memory (MEM) 146 and commands from a top level processor (not shown) to generate a position error signal (PES) indicative of head position error. The DSP 146 uses the PES to generate and output current control signals to a coil driver circuit 148 which in turn applies current to the actuator coil 126 to adjust the position of the selected head accordingly.

Figures 3, 4:
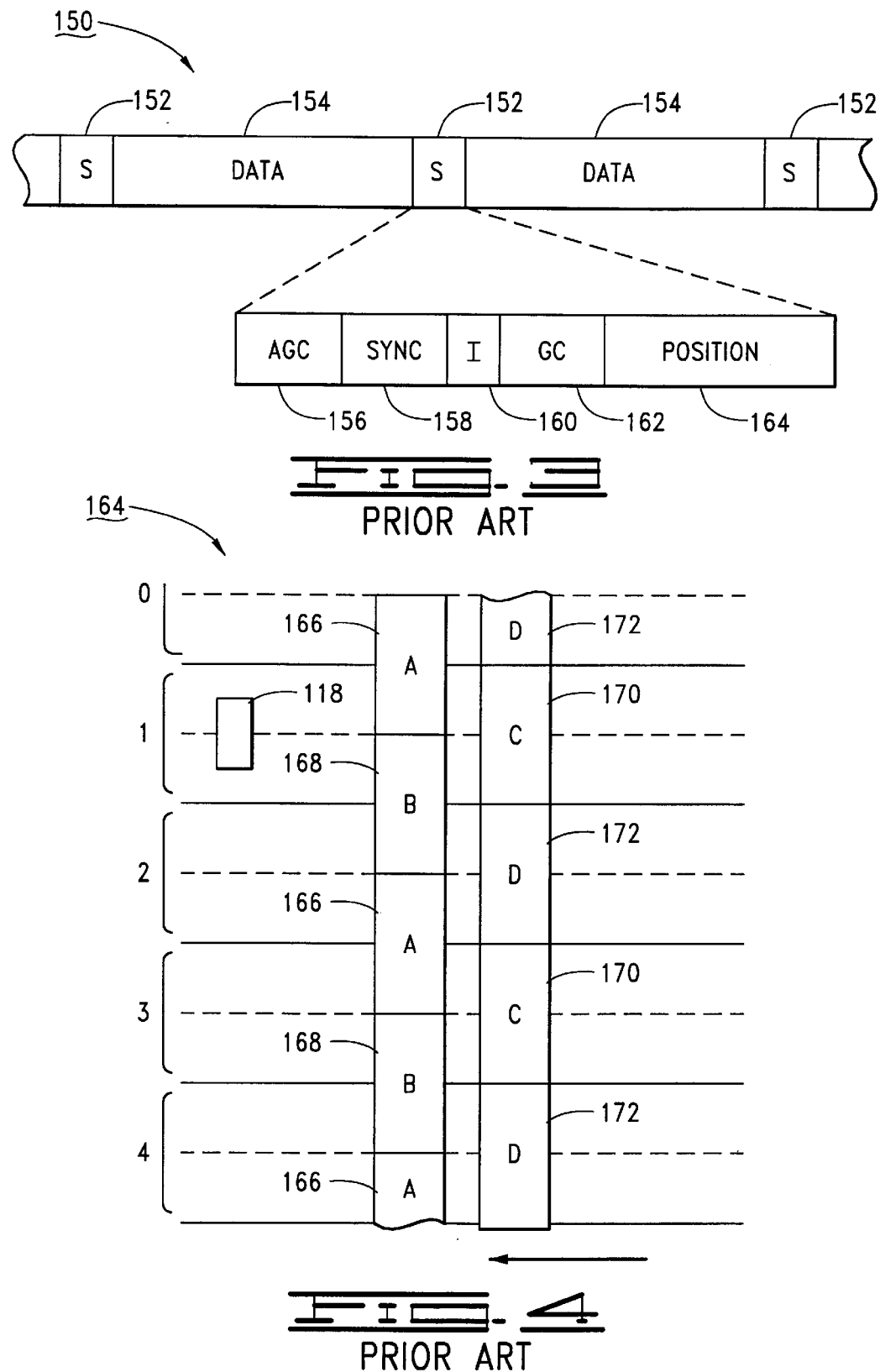
FIG. 3 is a representation of a portion of a track from one of the disc surfaces of the disc drive of FIG. 1 to generally illustrate the manner in which servo data and user data are stored on the disc surfaces.
FIG. 4 is a representation of a number of adjacent servo position fields which collectively store A, B, C and D servo burst patterns used to detect intra-track location of the head.

The disc drive 100 is contemplated as using a conventional embedded servo scheme, as illustrated by FIG. 3. More particularly, FIG. 3 shows a portion of a selected track 150 from a selected disc surface. Servo data fields 152 store servo data used to control head position, and are written during disc drive manufacturing. User data fields 154 are formed in the areas between adjacent servo data fields 152 during a disc drive formatting operation and are used to store user data from a host device.

FIG. 3 further shows a typical format for each of the servo data fields 152. It will be noted, however, that the format shown in FIG. 3 is for purposes of illustration, not limitation. An automatic gain control (AGC) field 156 stores an oscillating pattern of selected frequency and amplitude to condition the servo circuit 140 for receipt of remaining portions of the servo data. A synchronization (sync) field 158 stores a unique sync pattern used to identify the data as servo data. An index (I) field 160 indicates angular position of the servo data field 152. A Gray code (GC) field 162 stores a track address in Gray code format. A position field 164 stores a number of servo burst patterns (servo position data) used to detect intra-track positioning of the head 118.

FIG. 4 shows the format of the position field 166 in greater detail. More particularly, FIG. 4 is a representation of a number of adjacent servo position fields which collectively store A, B, C and D servo burst patterns (numerically designated as 166, 168, 170 and 172, respectively). The respective boundaries between each pair of A and B servo burst patterns define track centers (shown in broken line format), and the respective boundaries between each pair of C and D servo burst patterns define track boundaries (shown in solid line format). For convenience, the tracks defined by the position fields 164 in FIG. 4 have been numerically identified as tracks 0–4.

The A/B servo burst patterns and the C/D servo burst patterns are respectively angularly aligned on the disc surfaces, as shown. Each A servo burst pattern is written 180 degrees out of phase with respect to each B servo burst pattern. The same is true for the C and D servo burst patterns. Thus, as the position fields 164 pass under the head 118 in the direction 109, the head generates a combined servo signal PS1 as the combination of the respective sensed magnetizations of the A/B servo burst patterns, and then generates a combined servo signal PS2 as the combination of the respective sensed magnetizations of the C/D servo burst patterns.

Figure 5:
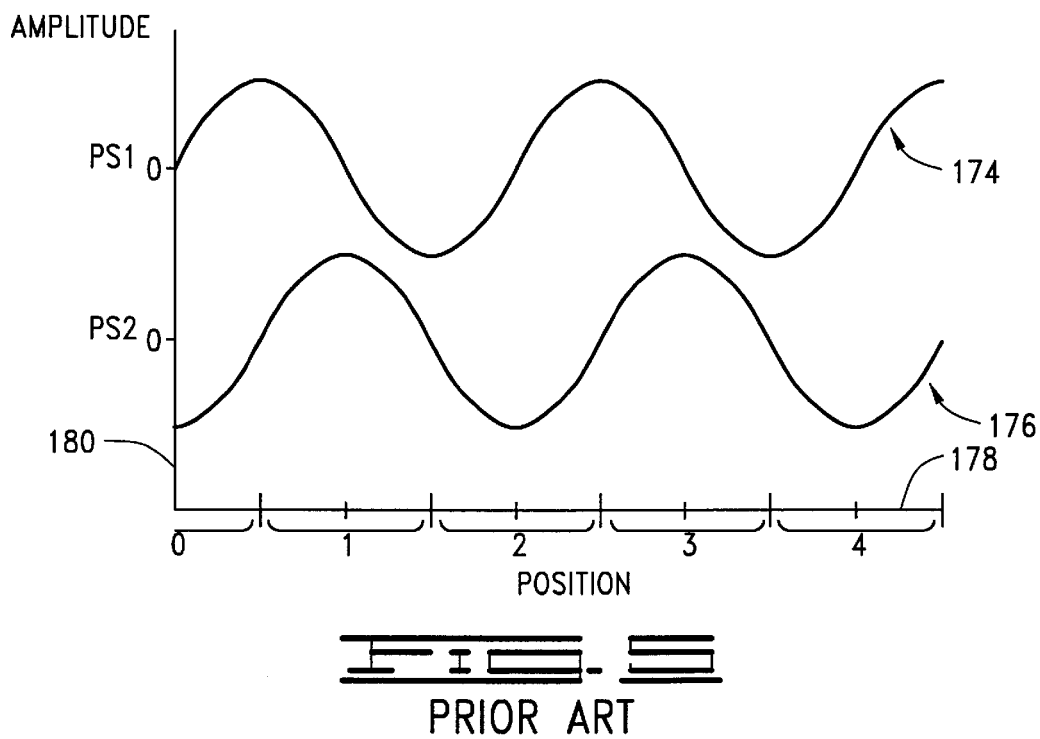
FIG. 5 provides graphical representations of PS1 and PS2 servo signals generated as a selected head respectively traverses the A/B and C/D servo burst pattern combinations of FIG. 4.

Graphical representations of PS1 and PS2 servo signals are shown in FIG. 5 at 174, 176. These signals are plotted against a position (track) x-axis 178 and an amplitude y-axis 180 as the head 118 is advanced across the tracks 0–4. From FIG. 5 it will be observed that the PS1 servo signal 174 provides mid-range (zero) values at track centers and maximum positive and negative values at track boundaries; contrawise, the PS2 servo signal 176 provides zero values at track boundaries and maximum positive and negative values at track centers. For reference, the PS1 and PS2 servo signals are also referred to herein as "servo position data signals."

Figure 6:
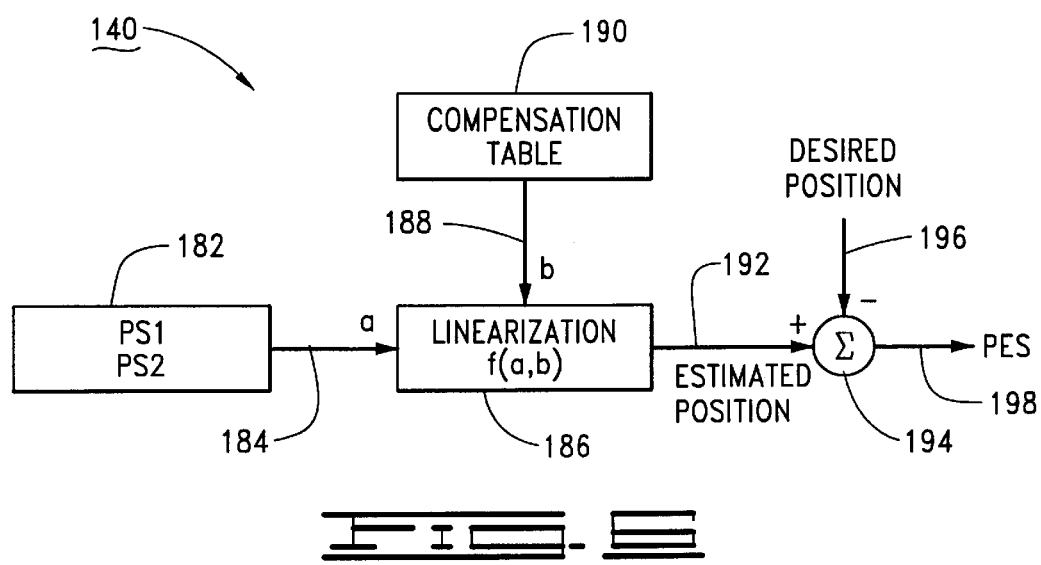
FIG. 6 is a control diagram of a portion of the servo circuit of FIG. 2 showing the general manner in which a position error signal (PES) is generated from the PS1 and PS2 servo signals of FIG. 5 using PES compensation values stored in a compensation table.
Figure 2:
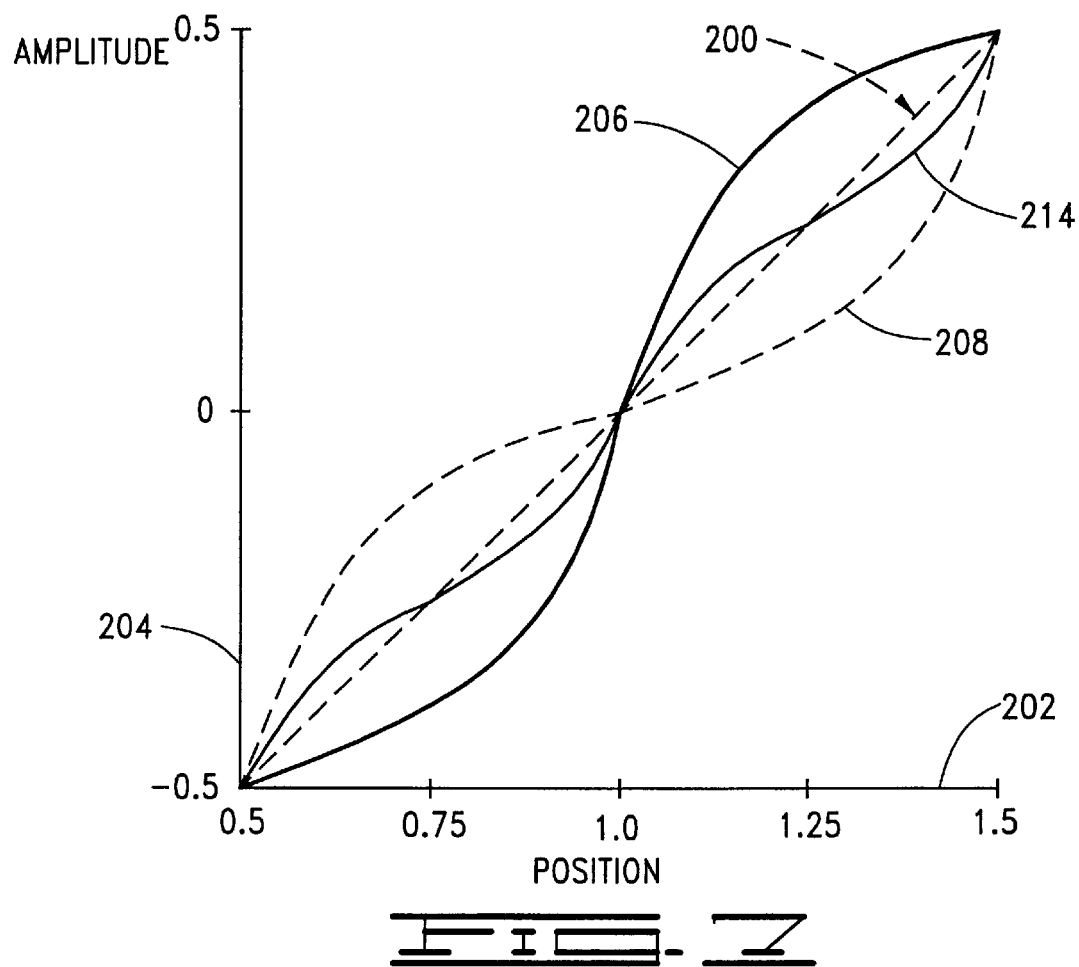
Figure 3:
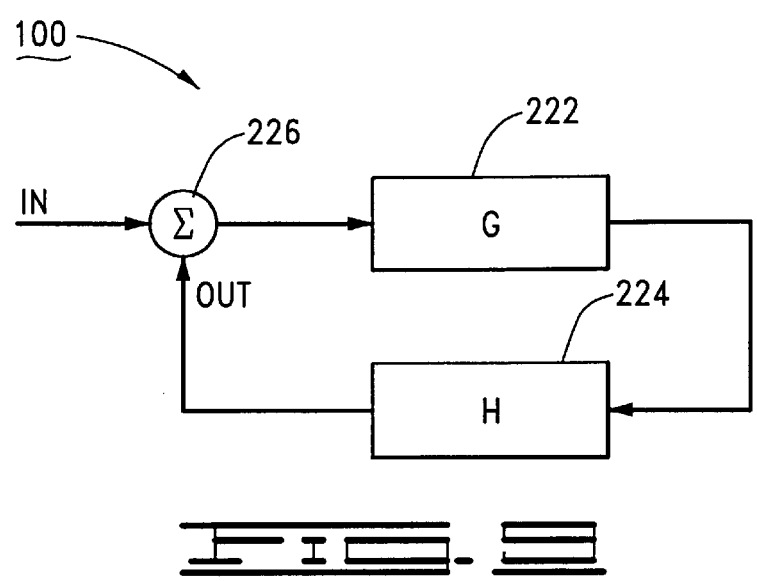

FIG. 6 provides a control diagram of relevant portions of the servo circuit 140 of FIG. 2 to illustrate the general manner in which a position error signal (PES) is generated from the PS1 and PS2 servo signals 174, 176 of FIG. 5. More particularly, FIG. 6 represents operation of the DSP 144 in accordance with appropriate programming in DSP memory 146.

The signals 174, 176 are provided from a PS1, PS2 block 182 on path 184 as an input "a" to a linearization block 186. The linearization block 186 receives PES compensation values on path 188 from a compensation table 190 as an input "b", and uses the PS1, PS2 servo signals and the PES compensation values in accordance with a selected function f(a,b) to generate an estimated position on path 192. The estimated position is combined at summing junction 194 with a desired position on path 196 to output the position error signal (PES) on path 198.

The need for the compensation values from the compensation table 190 can be observed from a review of FIG. 7, which shows an ideal PES curve 200 plotted against a position x-axis 202 and an amplitude y-axis 204. The ideal PES curve 200 exhibits nominally linear characteristics across the width of the track (in this case, track 1 from FIG. 4). For reference, the point 1.0 on the x-axis 202 corresponds to track center, the points 0.5 and 1.5 correspond to the track boundaries, and the points 0.75 and 1.25 are quarter track locations between track center and the track boundaries.

While the ideal PES 200 exhibits a linear form, in practice various factors can contribute to the introduction of nonlinearities in an actually derived PES. Such factors can include asymmetric reader sensitivity functions from the MR read elements of the heads 118, electrical offsets in the preamp 132 or demod 142, and the particular manner in which the servo signal samples are combined to form the PES. Thus, while the PS1 and PS2 servo signals 174, 176 of FIG. 5 are shown to be substantially sinusoidal, deviations from such shapes are typical during normal operation.

As a result of these and other factors, an actual PES (in the absence of applied linearization) will typically exhibit some amount of nonlinearity, such as exemplified by nonlinear PES curve 206. The PES compensation values in the table 190 (as represented by broken curve 208) are used to compensate the nonlinearities in the PES curve 206 to provide a resulting PES which substantially conforms to the linear PES curve 200.

Preferred methodologies for selecting appropriate PES compensation values for the compensation table 190 are discussed below. At this point, however, it will be helpful to briefly discuss the operation of the linearization block 186 to generate estimates of head position.

As will be apparent from the PS1 and PS2 servo signals 174, 176 of FIG. 5, such signals comprise a series of samples that are obtained as the selected head 118 transduces the servo burst patterns of each servo data field 152 (FIG. 3) and moves across the tracks 0–4 at a uniform radial rate. During normal track following operation, a selected head 118 is maintained in a desired relation over a corresponding selected track 150. A set of PS1, PS2 servo signal samples will be obtained as the head transduces the servo position data from each servo data field 152 encountered along the track. The linearization block 184 of FIG. 6 operates to combine each successive set of PS1, PS2 samples in accordance with a specified relationship, such as shown in equation (1):

$$X(k) = \frac{PS1(k)}{|PS1(k)| + |PS2(k)|} \quad (1)$$

where X(k) is an uncompensated position estimate with respect to the selected track at sample k, PS1(k) is the value of the PS1 servo signal sample at k, and |PS1| and |PS2| are the absolute values of the respective PS1, PS2 servo signal samples at k. The PES compensation values from the table 190 (FIG. 6) are arranged as a sequence of m discrete values, such as 32 samples which are evenly spaced across the width of the track. Interpolation techniques are applied as needed between adjacent values in the compensation table to derive an appropriate intermediate compensation value which is then added to the uncompensated position estimate to provide the resulting compensated head position estimate on path 192.

However, alternative embodiments for the linearization block 186 use the compensation values from the table 190 to adjust the PS1 and PS2 servo signals directly, and then combine the adjusted PS1 and PS2 servo signals in accordance with a selected relation including, but not limited to, that set forth by equation (1).

It will be noted that a variety of methodologies can be envisioned to combine the PS1, PS2 servo signals and the compensation values to arrive at a position estimate; in other words, the generalized function f(a,b) can take a variety of forms. The specific values stored in the compensation table will depend upon the manner in which the compensation values are used to linearize the PES.

At this point in the discussion it is important for purposes of clarity to note that the linearization block 186 is shown to determine an estimated head position which is then converted to a PES in relation to the desired head position. The summing junction 194 has been shown separately from the linearization block 186 in FIGS. 6 and 8 to illustrate these distinctions. However, the operation represented by summing junction 194 could readily be incorporated into the linearization block 186 so that the latter simply outputs a linearized PES. Hence, for purposes herein the combined operation of the linearization block 186 and the summing junction 194 will be collectively referred to as a "position error signal (PES) generation block."

The present discussion will now turn to a detailed review of the manner in which the final PES compensation values in the table 190 are selected, and FIG. 8 has been provided for this purpose. FIG. 8 includes several of the operational blocks from FIG. 6, and like numerals have been used for like components in FIGS. 6 and 8. As with FIG. 6, FIG. 8 represents relevant portions of the servo circuit 140, and preferably represents the operation of the DSP 144 in accordance with appropriate programming stored in DSP memory 146.

An initial compensation table 210 stores initial compensation values selected to remove substantially all of the nonlinearities in the PES. These initial values are temporarily loaded into a register 212 and supplied to the linearization block 186 as the selected head 118 is uniformly advanced across the width of a corresponding track. As described above, the linearization block uses the initial compensation values to generate head position estimates on path 192 which in turn are summed at summing junction 194 with a desired reference position (such as the center of the track) to generate PES samples on path 198.

If the initial compensation values from the table 210 were sufficient to remove all of the nonlinearities in the PES, then no optimization of the initial compensation values would be required. However, in practice the initial compensation values are selected and globally applied to a population of nominally identical disc drives during manufacturing, and so will not take into account factors that cause individual drives to exhibit slightly different amounts of PES nonlinearity. This is further true for each of the different heads 118 in the same drive, which will all typically exhibit slightly different amounts of PES nonlinearity.

It is therefore contemplated that the initial compensation values will operate to remove substantial amounts of nonlinearity from the PES, but some amount of error (nonlinearities) will remain in the resulting PES. To address this, the PES samples obtained using the initial compensation values are combined with the initial compensation values at summing junction 216 to provide updated compensation values to an updated compensation table 218.

This operation is generally illustrated in FIG. 7. Assume that curve 208 represents the initial compensation values from the initial compensation table 210 and PES curve 214 represents the resulting PES samples obtained from the application of the initial compensation values by the linearization block 186 as the head 118 is controllably advanced across the width of track 1 at a uniform rate. It can readily be seen that some of the initial compensation values were more effective than others in reducing PES nonlinearity in the resulting curve 214; for example, the PES curve 214 still exhibits a relatively significant amount of nonlinearity in the vicinity of position 1.3 on the x-axis 202.

Adjustment of the initial compensation values by combining the PES samples with the initial compensation values can require additional operations when the available PES samples do not line up exactly (with respect to radial track width) with the discrete values in the initial compensation table. For example, the operation of junction 216 can further involve interpolation of adjacent PES samples to arrive at an estimated PES sample which is then subtracted from the corresponding value in the set of compensation values. Thus, the summing junction 216 is more broadly referred to herein as an "adjustment block."

Once the updated compensation values are obtained and provided to the table 218 in FIG. 8, the values are loaded into the register 212 (via path 220) and the process is repeated using the updated values. The selected head 118 is once again directed to sweep across the selected track to generate a sequence of PS1, PS2 servo signal samples, and these samples are conditioned by the linearization block 186 using the new updated compensation values.

It is contemplated that, in at least a limited number of cases, the first updated set of compensation values might turn out to provide sufficient PES linearization characteristics. In such cases, no further actions will generally be required other than storing the first updated set of compensation values for subsequent normal drive operation. However, it is further contemplated that, in at least other cases, additional iterations using the most recently obtained set of compensation values each time might provide successive sets of compensation values that produce ever improved PES linearization characteristics. Thus, in some preferred embodiments the foregoing operation is repeated a number of passes to converge to a final set of compensation values that adequately linearizes the PES, and this final set of compensation values is thereafter used during subsequent normal drive operation.

A question thus arises as to how to determine that a given updated set of compensation values provides adequate PES linearization characteristics. One relatively easy solution is to configure the circuit of FIG. 8 to perform a preselected number of passes and to use the final set of compensation values obtained after the preselected number of passes has been completed. In other preferred embodiments, measurements are taken after each pass to evaluate the effectiveness of the most recently obtained set of compensation values, and the process continues until sufficiently satisfactory results are obtained.

The manner in which each successive set of compensation values is preferably evaluated to determine the effects on PES nonlinearity is set forth by FIG. 9. FIG. 9 is a basic control diagram for relevant portions of the disc drive 100. Block G 222, also referred to as the plant, represents certain aspects of the disc drive 100 including the coil driver 148, the actuator 110, the head 108, the preamp 132, and at least certain aspects of the demod 142. Block H 224, also referred to as the compensator, represents relevant operation of the DSP 144.

The plant 222 outputs a position in response to the input of current, and the compensator 224 outputs an actual position signal ("OUT") in response to the detected position of the plant. Summing junction 226 sums an input commanded position ("IN") indicative of a desired position with the actual position ("OUT") to provide the appropriate amount of current to the plant 222 to achieve the desired position.

By applying a time-varying input of relatively small amplitude at the IN terminal to summing junction 226, a corresponding time-varying signal will be presented at the OUT terminal. A gain measurement can be obtained in accordance with the following relation:

$$K_T = \frac{|OUT|}{|IN|} \quad (2)$$

where $K_T$ is the resulting gain measurement, $|OUT|$ is the peak to peak magnitude of the signal at the OUT terminal, and $|IN|$ is the peak to peak magnitude of the signal at the IN terminal. By taking multiple gain measurements in accordance with equation (2) as the head is regularly advanced across the width of the track, a cross-track gain profile can be obtained that is correlated to the amount of PES nonlinearity across the track. The time-varying input in preferably sinusoidal.

Figure 10:
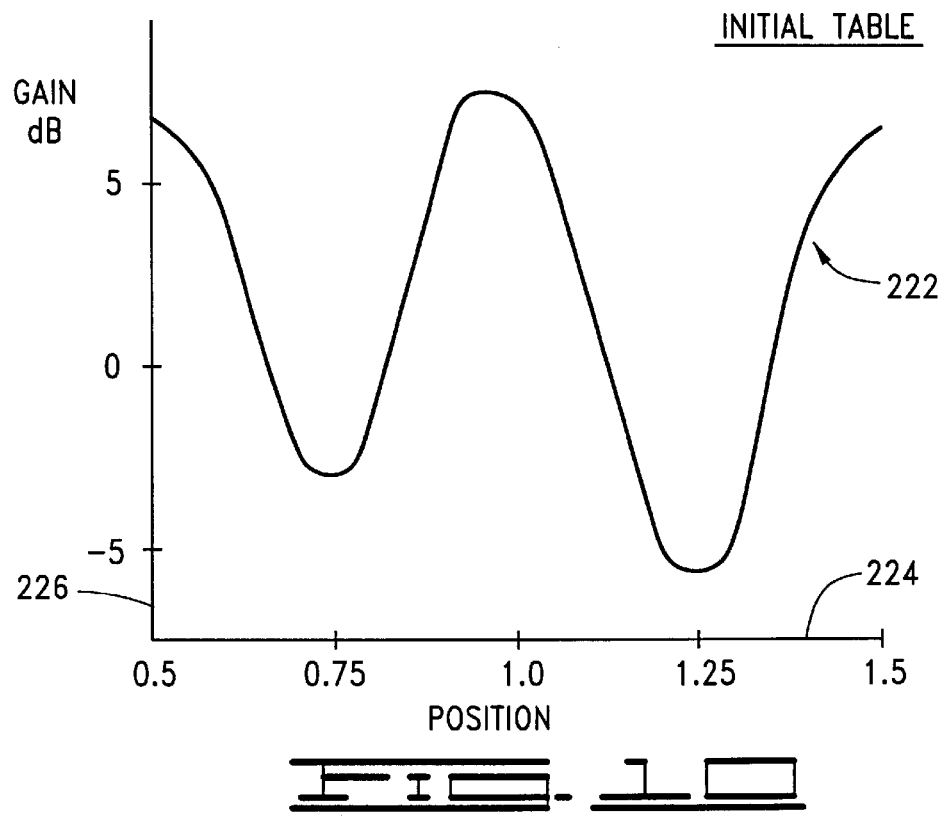
FIGS. 10–13 provide graphical representations of gain values obtained during the iterative determination of the final PES compensation values.

By way of illustration, FIG. 10 provides a graphical representation of a gain profile curve 222 plotted against a position x-axis 224 (indicative of the width of track 1) and a gain amplitude y-axis 226. The gain profile curve 222 is a representative gain profile using the initial compensation values from the initial compensation table 210 in FIG. 8 (during the first pass). It will be noted that a maximum peak to peak magnitude $K_{pp}$ of the initial gain profile curve 222 is around 12 dB.

Figure 11:
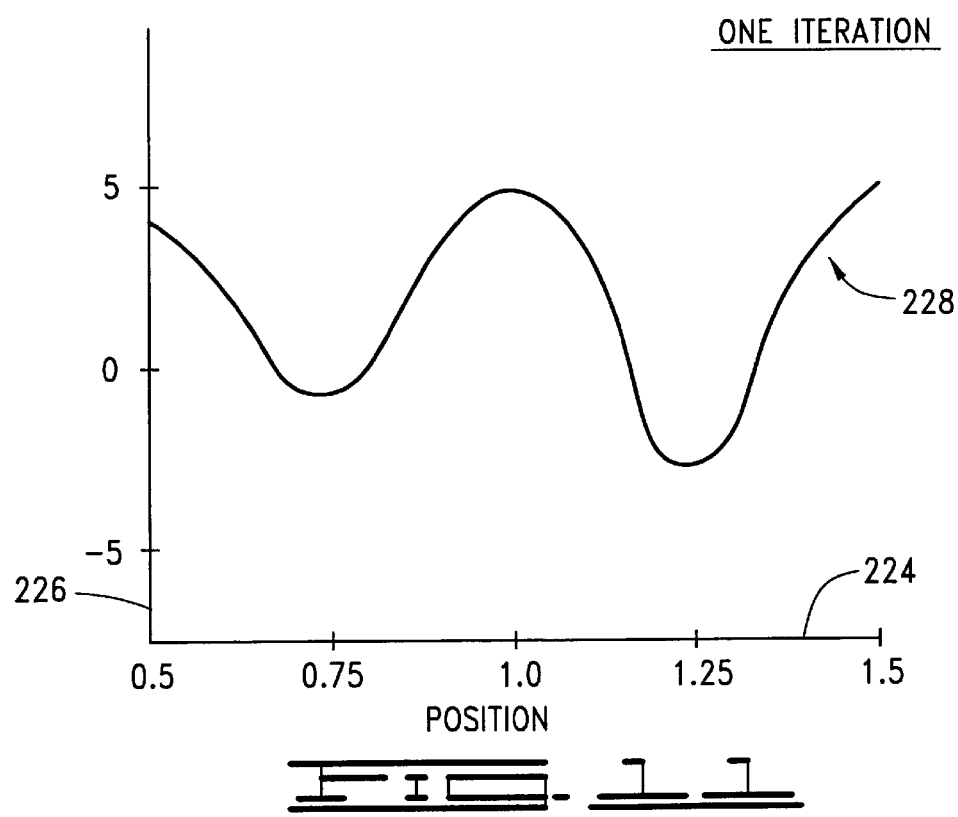
Figure 12:
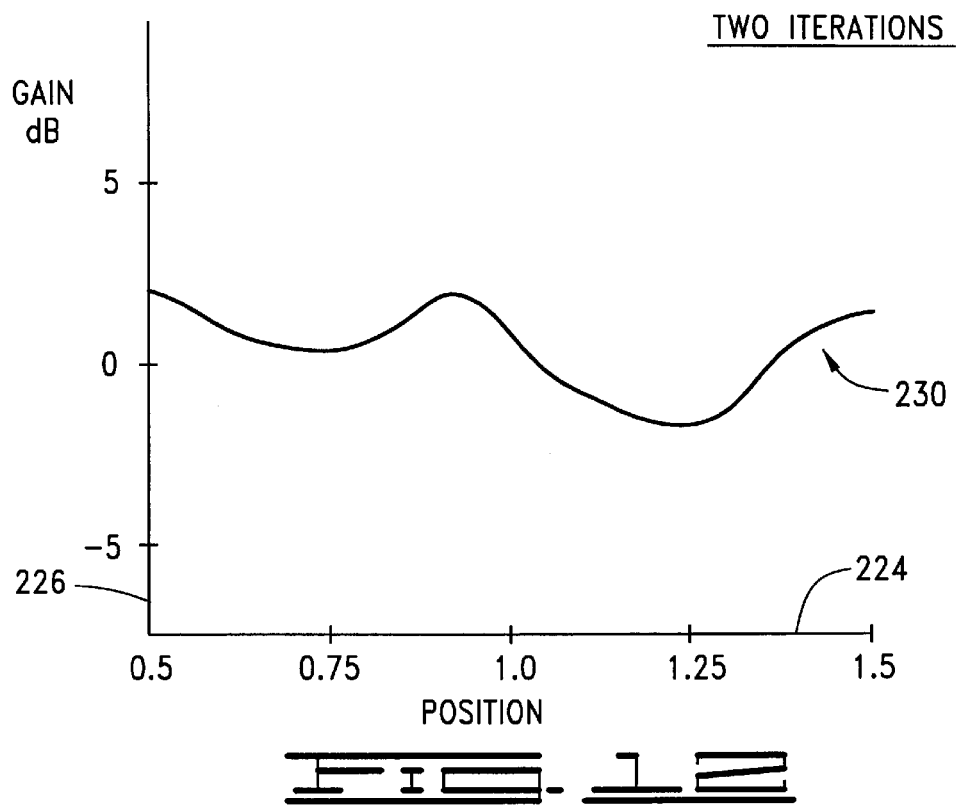
Figure 13:
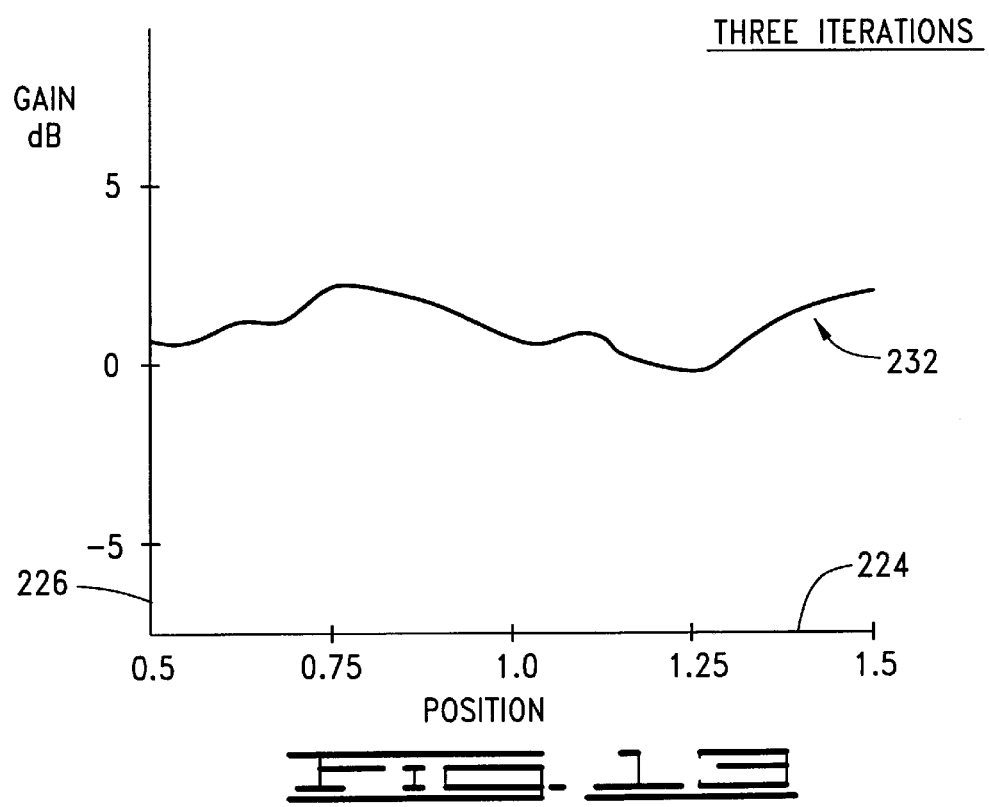

FIG. 11 shows a representative gain profile curve 228 obtained after the first iteration (second pass through the circuit of FIG. 8) using the first set of updated compensation values. The first set of updated compensation values reduces the peak to peak magnitude $K_{pp}$ to about 7 dB. FIG. 12 provides a gain profile curve 230 after the second iteration, with a resulting peak to peak magnitude $K_{pp}$ of around 4 dB. FIG. 13 provides a gain profile curve 232 after the third iteration, with a peak to peak magnitude $K_{pp}$ of less than about 3 dB.

Figure 14:
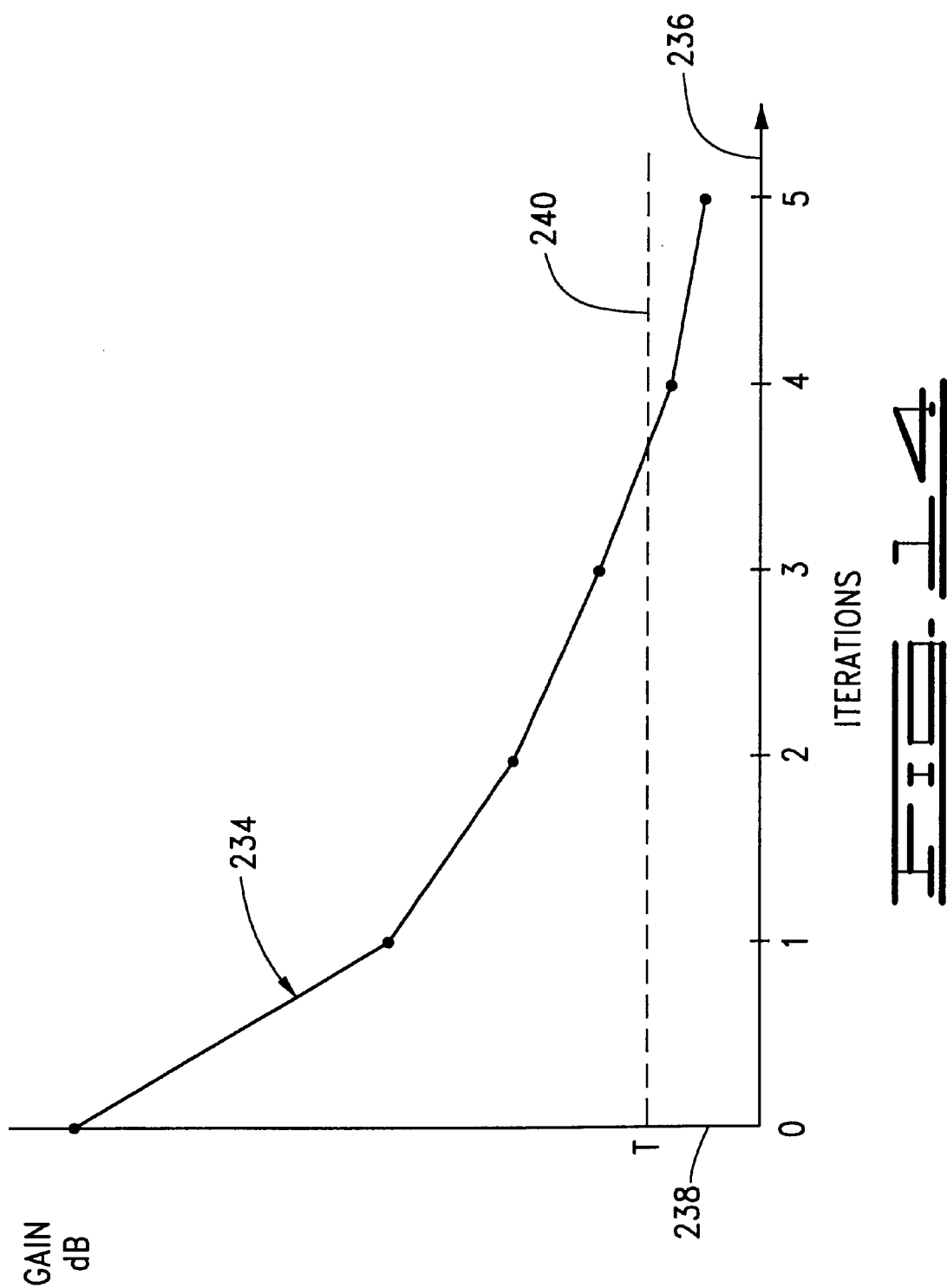
FIG. 14 is a graphical representation of the maximum gain over a number of subsequent iterations to show the convergence of the final PES compensation values.

FIG. 14 shows a generalized gain magnitude curve 234 to show the reduction in peak to peak magnitude from gain profiles such as illustrated in FIGS. 10–13 over successive iterations. The curve 234 is plotted against an x-axis 236 indicative of the number of iterations and a y-axis 238 indicative of amplitude. The gain will tend to converge toward a final value as more iterations are performed. However, it may not be necessary to achieve full convergence; rather, a threshold T (denoted by broken line 240) is preferably selected to correlate to an acceptable amount of remaining PES nonlinearity, and the iterations of FIG. 8 are repeated until the maximum peak to peak magnitude $K_{pp}$ reaches this threshold level.

To summarize the foregoing operation, FIG. 15 provides a flow chart for a COMPENSATION TABLE OPTIMIZATION routine 250. Preferably, the routine 250 is performed during disc drive manufacturing, but the routine can also be performed at other times as desired, such as during subsequent field use. The routine 250 is preferably performed using each head 118 in turn.

With reference again to FIG. 8, initial compensation values (table 210) are selected at step 252 and used at step 254 to generate a sequence of PES samples (path 198). The PES samples are used to generate updated compensation values (table 218) at step 256. The updated compensation values are further loaded into the register 212 for subsequent use by the linearization block 186 during this step.

The drive next operates at step 258 to obtain a cross-track gain profile as a sequence of gain measurements using the updated compensation values and equation (2). Such gain profile is generally represented by the curve 228 in FIG. 11. The maximum peak to peak magnitude $K_{pp}$ of the resulting gain profile is also determined during this step (curve 234, FIG. 14).

Decision step 260 determines whether the peak to peak magnitude $K_{pp}$ determined during step 258 is less than a threshold T (line 240, FIG. 14). If not, the routine returns and performs another iteration of steps 254, 256, 258 and 260 using the updated compensation values. Additional iterations are performed until the peak to peak magnitude $K_{pp}$ is within the threshold T, after which the final set of compensation values are stored at step 262 for subsequent drive use. The routine then ends at step 264.

It will be noted that the final set of compensation values are thereafter used to generate PES samples for the selected track. To the extent that the factors that introduce nonlinearities in the PES are related primarily to the head, the same compensation values can be advantageously used for all of the tracks on the disc recording surface. However, it is further anticipated that the compensation values can be determined for different sets of tracks, such as on a zone basis in drives that employ zone based recording (ZBR).

Moreover, while the routine of FIG. 15 sets forth continued operation over a number of passes n until the peak to peak magnitude of the gain profile falls within the threshold T, the routine can be additionally modified so that a maximum number of iteration passes, such as n=5, are allowed to not unduly extend the optimization process.

Finally, while the foregoing embodiments have used A, B, C and D burst patterns arranged to generate the combined PS1 and PS2 servo signals, such configuration is illustrative and not limiting. Other numbers and configurations of servo burst patterns with various respective alignments on the recording surface can readily be used as desired.

It will now be appreciated that the present invention is directed to an apparatus and method for controlling the position of a head in a disc drive data handling system by removing nonlinearities in a position error signal used to control head position. In accordance with preferred embodiments, a disc drive data handling device 100 is provided having a disc recording surface 108 and a controllably positionable read/write head 118, the disc recording surface having a number of nominally concentric tracks 150 defined by servo position data 166, 168, 170, 172, each track having a radial width with respect to the disc recording surface. The position of the head is controlled by a method comprising steps of (a) generating a sequence of position error signal (PES) samples indicative of head position with respect to a selected track using servo position data samples transduced from the selected track and a first set of compensation values selected to reduce nonlinearities in said PES samples across the radial width of said track (step 254, FIG. 15); (b) combining the PES samples with the first set of compensation values to generate an updated set of compensation values (step 256); and (c) storing the updated set of compensation values for subsequent use by the disc drive to generate PES samples for the selected track (step 262).

Preferably, steps (a) and (b) are repeated a number of passes using the most recently obtained updated set of compensation values during each successive pass to arrive at a final updated set of compensation values, and using the final updated set of compensation values during step (c).

In another preferred embodiment, additional steps are performed of (d) measuring a gain profile across the radial width of the track using the updated set of compensation values and (e) determining a maximum peak to peak magnitude of the gain profile (step 258); (f) comparing the maximum peak to peak magnitude to a predetermined threshold (step 260); and (g) when the maximum peak to peak magnitude exceeds the predetermined threshold, repeating steps (a), (b), (d), (e) and (f) a number of passes using the most recently obtained updated set of compensation values during each successive pass until a final updated set of compensation values is obtained that provides a gain profile having a maximum peak to peak magnitude within the predetermined threshold, after which the final updated set of compensation values is used during step (c).

In another preferred embodiment, a disc drive data handling system 100 is provided comprising a disc recording surface 108 having a number of nominally concentric tracks 150 defined by servo position data 166, 168, 170, 172, each track having a radial width with respect to the disc recording surface; a head 118 configured to write data to and transduce data from the disc recording surface; and a servo circuit 140 which controls position of the head with respect to the disc recording surface.

The servo circuit in turn comprises demodulation circuitry 142 which generates servo position data signal samples 174, 176 from servo position data transduced by the head from a selected track; a first memory table 210 which stores a first set of compensation values; a position error signal (PES) generation block 186, 194 which generates a sequence of PES samples indicative of head position with respect to the selected track using the servo position data signal samples and the first set of compensation values, the first set of compensation values selected to reduce nonlinearities in said PES samples across the radial width of said track; an adjustment block 216 which combines the PES samples with the first set of compensation values to generate an updated, second set of compensation values; and a second memory table 218 which stores the second of compensation values for subsequent use by the servo circuit.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method comprising:
   (a) generating position error signal (PES) samples indicative of position error of a head with respect to a selected track using servo position data samples transduced from the selected track and a first set of compensation values selected to reduce nonlinearities in said PES samples; and
   (b) combining the PES samples with the first set of compensation values to generate an updated set of compensation values.

2. The method of claim 1, further comprising steps of repeating the generating and combining steps a number of passes using the most recently obtained updated set of compensation values during each successive pass to arrive at a final updated set of compensation values, and using the final updated set of compensation values to subsequently generate PES samples for the selected track.

3. The method of claim 1, further comprising a step of using the updated set of compensation values to generate PES samples for additional tracks on the disc recording surface.

4. The method of claim 1, further comprising steps of:
   measuring a gain profile across the radial width of the track using the updated set of compensation values;
   determining a maximum peak to peak magnitude of the gain profile;
   comparing the maximum peak to peak magnitude to a predetermined threshold; and
   when the maximum peak to peak magnitude exceeds the predetermined threshold, repeating the generating, combining, measuring, determining and comparing steps a number of passes using the most recently obtained updated set of compensation values during each successive pass until a final updated set of compensation values is obtained that provides a gain profile having a maximum peak to peak magnitude within the predetermined threshold, after which the final updated set of compensation values is used to subsequently generate PES samples for the selected track.

5. The method of claim 1, wherein the combining step comprises subtracting the PES samples from at least selected ones of the first set of compensation values to generate the updated set of compensation values.

6. An apparatus, comprising:
   a data transducing head controllably positionable adjacent a disc recording surface; and first means for controlling position of the head by generating position error signal (PES) samples indicative of head position with respect to a selected track on said surface by combining servo position data signal samples with a first set of compensation values selected to remove nonlinearities in the PES samples, and then combining the PES samples with the first set of compensation values to obtain an updated, second set of compensation values.

7. The apparatus of claim 6, wherein the first means comprises a servo circuit comprising:

demodulation circuitry which generates the servo position data signal samples from servo position data transduced by the head from the selected track;

a first memory table which stores the first set of compensation values;

a position error signal (PES) generation block which generates PES samples using the servo position data signal samples and the first set of compensation values;

an adjustment block which combines the PES samples with the first set of compensation values to generate the second set of compensation values; and a second memory table which stores the second of compensation values for subsequent use by the servo circuit.

8. The apparatus of claim 7, wherein the PES samples is characterized as a first sequence of PES samples, and wherein the servo circuit further operates to generate a second sequence of PES samples using the second set of compensation values and then combine the second set of PES samples with the second set of compensation values to generate an updated, third set of compensation values.

9. The apparatus of claim 8, wherein the servo circuit further operates a number of n additional passes to obtain a final set of compensation values which are thereafter stored in the second memory table for subsequent use by the servo circuit.

10. The apparatus of claim 7, wherein the servo circuit subsequently uses the second set of compensation values to generate PES samples for a plurality of tracks on the disc recording surface.

11. The apparatus of claim 7, wherein the servo circuit further operates to:

measure a gain profile across the radial width of the track using the second set of compensation values;

determine a maximum peak to peak magnitude of the gain profile;

compare the maximum peak to peak magnitude to a predetermined threshold; and when the maximum peak to peak magnitude exceeds the predetermined threshold, generate a new sequence of PES samples using the most recently obtained set of compensation values and repeat the measuring, determining and comparing steps a number of passes until a final set of compensation values is obtained that provides a gain profile having a maximum peak to peak magnitude within the predetermined threshold, after which the final set of compensation values is stored in the second memory table for subsequent use by the servo circuit.

12. An apparatus comprising a servo circuit configured to combine a first set of compensation values with transduced servo position data samples to generate position error signal (PES) samples indicative of position error of a data transducing head with respect to a track on a recording medium, the first set of compensation values selected to reduce nonlinearities in said PES samples, and then generate an updated set of compensation values by combining the first set of compensation values with said PES samples.

13. The apparatus of claim 12 in combination with said recording medium and said data transducing head.

14. The apparatus of claim 12, further comprising a memory location which stores the updated set of compensation values.

15. The apparatus of claim 12, wherein the servo circuit subsequently uses the updated set of compensation values to generate PES samples for a plurality of tracks on the disc recording surface.

* * * * *